United States Patent
Steffes et al.

(10) Patent No.: US 6,298,047 B1
(45) Date of Patent: Oct. 2, 2001

(54) METHOD AND APPARATUS FOR ESTABLISHING A DATA LINK BETWEEN A PORTABLE DATA COMMUNICATIONS DEVICE AND AN INTERFACE CIRCUIT

(75) Inventors: Christopher Carl Steffes, Portland; Anthony Tonizzo, Kentwood; George William Vallillee, IV, Grand Rapids, all of MI (US)

(73) Assignee: Steelcase Development Inc., Caledonia, MI (US)

(*) Notice: Subject to any disclaimer, the term of this patent is extended or adjusted under 35 U.S.C. 154(b) by 0 days.

(21) Appl. No.: 09/081,726

(22) Filed: May 20, 1998

(51) Int. Cl.⁷ ..................................................... H04B 7/00
(52) U.S. Cl. ........................................... 370/310; 370/388
(58) Field of Search ..................... 370/310, 396, 370/328, 338, 339, 340; 320/270, 304, 312, 313, 319, 324, 326, 327, 334, 339, 350, 352, 353, 356, 394; 455/428, 430, 434, 32.1, 524, 525, 88, 560, 102, 136, 138, 161.1

(56) References Cited

U.S. PATENT DOCUMENTS

| Re. 35,035 | 9/1995 | Shipley ................................ | 359/154 |
|---|---|---|---|
| D. 358,380 | 5/1995 | Sakaguchi ............................ | D14/114 |
| 3,330,955 | 7/1967 | Barecki et al. ....................... | 250/199 |
| 3,705,986 | 12/1972 | Sanders et al. ....................... | 250/199 |
| 4,275,385 | 6/1981 | White .................................. | 340/312 |
| 4,402,090 | 8/1983 | Gfeller et al. ........................ | 455/601 |

(List continued on next page.)

FOREIGN PATENT DOCUMENTS

| 3223831 A1 | 2/1983 | (DE) . |
|---|---|---|
| 0 192 894 | 9/1986 | (EP) . |
| WO 93/21581 | 10/1993 | (EP) . |
| 724 227 A2 | 7/1996 | (EP) . |
| 2079088 | 1/1982 | (GB) . |
| 2 296 584 | 7/1996 | (GB) . |

(List continued on next page.)

OTHER PUBLICATIONS

"PLX 1000" Parallax Research (printed from Internet on May 9, 1997).
"HP Creates a Simple, Reliable Way to Connect Portable PC's to a LAN" Hewlett Packard (printed from Internet on May 9, 1997).
"Wireless File Transfer Between Notebook and Desktop PCs" TekrAm (printed from Internet on May 9, 1997).
"Products Overview" Parallax Research (printed from Internet on May 9, 1997).

(List continued on next page.)

Primary Examiner—Dang Ton
Assistant Examiner—Phirin Sam
(74) Attorney, Agent, or Firm—Foley & Lardner

(57) ABSTRACT

A wireless data communication system for establishing a data link between a portable communication device and an interface circuit, such as an interface circuit to a LAN, includes a plurality of transceivers in communication with a control circuit. Each of the transceivers is configured to transmit and receive wireless signals within a defined transceiver space. The plurality of transceiver spaces combine to define a communication space. The control circuit detects the presence of a wireless signal within the communications space by sequentially scanning the transceivers to determine which transceiver is receiving the signal. Once the signal is detected, the control circuit automatically locks onto the transceiver receiving the signal, thereby enabling establishment of a wireless data link between the communication device and the interface circuit. The control circuit continues to monitor the established data link to determine whether data communications are disrupted. Upon detection of a disruption, the control circuit automatically attempts to retain the data link by re-initiating the scanning sequence.

65 Claims, 8 Drawing Sheets

U.S. PATENT DOCUMENTS

| | | | |
|---|---|---|---|
| 4,408,543 | 10/1983 | Griffin | 108/24 |
| 4,426,738 | 1/1984 | Sato | 455/603 |
| 4,450,319 | 5/1984 | Lucey | 179/2 EA |
| 4,456,793 | 6/1984 | Baker et al. | 179/99 |
| 4,516,221 | 5/1985 | Nakata | 364/900 |
| 4,601,064 | 7/1986 | Shipley | 455/608 |
| 4,628,541 | 12/1986 | Beavers | 455/603 |
| 4,649,385 | 3/1987 | Aires et al. | 379/57 |
| 4,659,048 | 4/1987 | Fahrion | 248/285 |
| 4,717,913 | 1/1988 | Elger | 349/825.54 |
| 4,727,600 | 2/1988 | Avakian | 455/601 |
| 4,807,222 | 2/1989 | Amitay | 370/85 |
| 4,809,257 | 2/1989 | Gantenbein et al. | 370/4 |
| 4,837,568 | 6/1989 | Snaper | 340/825.54 |
| 4,843,606 | 6/1989 | Bux et al. | 370/89 |
| 4,856,046 | 8/1989 | Streck et al. | 379/56 |
| 4,866,704 | 9/1989 | Bergman | 370/85.4 |
| 4,866,758 | 9/1989 | Heinzelmann | 379/94 |
| 4,932,050 | 6/1990 | Davidson et al. | 379/211 |
| 4,959,874 | 9/1990 | Saruta et al. | 455/601 |
| 4,975,926 | 12/1990 | Knapp | 375/1 |
| 4,977,618 | 12/1990 | Allen | 455/607 |
| 5,062,151 | 10/1991 | Shipley | 359/154 |
| 5,068,916 | 11/1991 | Harrison et al. | 455/39 |
| 5,087,982 | 2/1992 | Smothers | 359/137 |
| 5,099,346 | 3/1992 | Lee et al. | 359/118 |
| 5,191,461 | 3/1993 | Cranshaw et al. | 359/154 |
| 5,218,356 | 6/1993 | Knapp | 342/356 |
| 5,235,258 | 8/1993 | Schuerch | 318/16 |
| 5,241,410 | 8/1993 | Streck et al. | 359/176 |
| 5,247,380 | 9/1993 | Lee et al. | 359/118 |
| 5,253,095 | 10/1993 | Menadier et al. | 359/174 |
| 5,276,680 | 1/1994 | Messenger | 370/85.1 |
| 5,276,703 | 1/1994 | Budin et al. | 375/1 |
| 5,283,819 | 2/1994 | Glick et al. | 379/90 |
| 5,297,144 | 3/1994 | Gilbert et al. | 370/95.2 |
| 5,305,132 | 4/1994 | Fasen et al. | 359/113 |
| 5,307,297 | 4/1994 | Iguchi et al. | 364/708.1 |
| 5,309,351 | 5/1994 | McCain et al. | 364/132 |
| 5,321,542 | 6/1994 | Freitas et al. | 359/172 |
| 5,363,229 | 11/1994 | Sakurai et al. | 359/159 |
| 5,363,425 | 11/1994 | Mufti et al. | 379/38 |
| 5,369,686 | 11/1994 | Dutra et al. | 379/94 |
| 5,384,652 | 1/1995 | Allen et al. | 359/172 |
| 5,387,993 | 2/1995 | Heller et al. | 359/155 |
| 5,387,994 | 2/1995 | McCormack et al. | 359/159 |
| 5,398,280 | 3/1995 | MacConnell | 379/93 |
| 5,400,246 | 3/1995 | Wilson et al. | 364/146 |
| 5,402,469 | 3/1995 | Hopper et al. | 379/93 |
| 5,416,627 | 5/1995 | Wilmoth | 359/159 |
| 5,424,859 | 6/1995 | Uehara et al. | 359/152 |
| 5,438,937 | 8/1995 | Ball et al. | 108/64 |
| 5,440,559 | 8/1995 | Gaskill | 370/95.1 |
| 5,455,851 | 10/1995 | Chaco et al. | 379/38 |
| 5,457,742 | 10/1995 | Vallillee et al. | 379/352 |
| 5,461,627 | 10/1995 | Rypinski | 370/95.2 |
| 5,463,623 | 10/1995 | Grimes et al. | 370/79 |
| 5,471,503 | * 11/1995 | Altmaier et al. | 375/133 |
| 5,479,408 | 12/1995 | Will | 370/94.1 |
| 5,493,283 | 2/1996 | Hopper et al. | 340/825.34 |
| 5,508,836 | 4/1996 | DeCaro et al. | 359/189 |
| 5,515,426 | 5/1996 | Yacenda et al. | 379/201 |
| 5,526,351 | 6/1996 | Mochinaga et al. | 370/60.1 |
| 5,528,621 | * 6/1996 | Heiman et al. | 375/133 |
| 5,539,665 | 7/1996 | Lamming et al. | 364/514 R |
| 5,548,637 | 8/1996 | Heller et al. | 379/201 |
| 5,550,913 | 8/1996 | McMaster et al. | 379/230 |
| 5,564,020 | 10/1996 | Rossi | 395/200.15 |
| 5,564,070 | 10/1996 | Want et al. | 455/53.1 |
| 5,566,022 | 10/1996 | Segev | 359/172 |
| 5,568,544 | 10/1996 | Keeler et al. | 379/273 |
| 5,596,648 | 1/1997 | Fast | 381/77 |
| 5,600,471 | 2/1997 | Hirohashi et al. | 359/152 |
| 5,602,843 | 2/1997 | Gray | 370/338 |
| 5,606,444 | 2/1997 | Johnson et al. | 359/152 |
| 5,617,236 | 4/1997 | Wang et al. | 359/172 |
| 5,627,524 | 5/1997 | Frederickson et al. | 340/825.07 |
| 5,630,204 | * 5/1997 | Hylton et al. | 370/312 |
| 5,640,390 | 6/1997 | Sakamoto et al. | 370/346 |
| 5,646,761 | 7/1997 | Medved et al. | 359/172 |
| 5,668,803 | * 9/1997 | Tymes et al. | 455/3.3 |
| 5,681,008 | 10/1997 | Kinstler | 244/3.11 |
| 5,742,596 | 4/1998 | Baratz et al. | 370/356 |
| 5,781,536 | * 7/1998 | Ahmadi et al. | 370/252 |
| 5,804,810 | * 9/1998 | Woolley et al. | 235/492 |
| 5,870,385 | * 2/1999 | Ahmadi et al. | 370/252 |
| 5,907,544 | * 5/1999 | Rypinski | 370/337 |
| 6,009,124 | * 12/1999 | Smith et al. | 375/267 |

FOREIGN PATENT DOCUMENTS

| | | |
|---|---|---|
| 2 296 622 | 7/1996 | (GB) . |
| 58-114639 | 7/1983 | (JP) . |
| 60-7232 | 1/1985 | (JP) . |
| 60-180230 | 9/1985 | (JP) . |
| 62-14539 | 1/1987 | (JP) . |
| 62-14540 | 1/1987 | (JP) . |
| 2-87836 | 3/1990 | (JP) . |
| 3-274837 | 12/1991 | (JP) . |

OTHER PUBLICATIONS

"VIPER IRDA Infrared Adapter for PC Motherboard" Parallax Research (printed from Internet on May 9, 1997).

"Desk Top Computing" Hewlett Packard (printed from Internet on May 9, 1997).

"ACTiSYS" (printed from Internet on May 9, 1997).

"Making Network Access Easy for Portable PC Users" Hewlett Packard (printed from Internet on May 9, 1997).

"HP Netbeamir Infrared Access Point—Product Specifications" Hewlett Packard (printed from Internet on May 9, 1997).

Proceedings of the IEEE; Nov., 1979; Gfeller et al; Wireless In–House Data Communication Via Diffuse Infrared Radiation.

IEEE; 1978; Gfeller et al.; Infrared Communication For In–House Applications.

IBM Technical Disclosure Bulletin; Feb., 1986; Gfeller et al.; Asynchronous Communication Link For Infrared Transmission.

IBM Technical Disclosure Bulletin; Jan., 1983; Gfeller; Minicomputer System Components Interconnected Via A Serial Infrared Link.

IBM Technical Disclosure Bulletin; Feb., 1986; Touchpad Cable Function.

IBM Technical Disclosure Bulletin; Mar., 1986; Group Encoding Method for Infrared Communication.

"Wireless Infrared Connections for Portable Computer Users" JetEye Infrared Products.

"Infranet: Infrared Microbroadcasting Network for In–House Data Communication".

HP Press Release; "HP to Support New 4MBPS Infrared Networking Product" (printed from Internet on May 9, 1997).

\* cited by examiner

METHOD AND APPARATUS FOR ESTABLISHING A DATA LINK BETWEEN A PORTABLE DATA COMMUNICATIONS DEVICE AND AN INTERFACE CIRCUIT

FIELD OF THE INVENTION

The present invention relates generally to a data communication system in which a data link is established between a portable data communication device and an interface circuit, such as an interface circuit that provides data communication access to a network or to another electronic device. In particular, the invention relates to an infrared data communication system in which a wireless data link is automatically established and retained between the portable data communication device and the interface circuit when an electrical signal transmitted from the communication device is detected within a defined communication area.

BACKGROUND OF THE INVENTION

In recent years, the use of portable data communication devices has become commonplace and even necessary in today's work environment. Workers must often travel from their offices and yet must retain connectivity to the workplace to access their workfiles and to respond to communications from others. Portable data communication devices, such as laptop computers, wireless telephones and pagers, facilitate travel outside of the workplace by enabling the mobile worker to maintain access to workfiles, such as via a modem or wireless link to a wired local area network (LAN), and to respond to communications from others, such as by e-mail, wireless telephone or pager.

Even within the work environment itself, workers often move about freely to attend meetings or to engage in conferences with co-workers. Yet, for a worker to retain connectivity to the workplace while moving about within the workplace, the worker must transport much of the same burdensome baggage as if he were traveling away from the workplace: a laptop computer, a pager, and perhaps even a wireless telephone, and possibly even a collection of wires and connectors. In addition, to gain access to the LAN, the internally mobile worker must find an available access port to establish a communications link, which may be difficult in conference rooms or offices where more than one user wants to connect. Thus, the worker may not be able to gain access to workfiles or presentation programs that would be useful when communicating to co-workers, or, if borrowing an access port assigned to another person, the mobile worker may not be able to access coded files or other privileges that have been tailored to the mobile worker's needs. Also, a worker who is often absent from his designated work space may often miss important communications from others, such as phone calls, because the worker cannot be located within the work facility.

Although solutions are known which address the foregoing problems, the solutions are not complete or introduce other complications. For example, to ensure that a mobile worker receives incoming communications, one known solution includes a public address system for paging the worker. Other more sophisticated solutions include systems that locate mobile workers within the work environment through the use of a network of wireless transmitters, such as badges worn by the worker, and receivers that may be mounted in fixed locations throughout the work facility. Once the individual's location has been determined, such systems may, for example, automatically route telephone calls to the telephone nearest the individual's location. Additionally, such systems may provide the individual with certain privileges, such as access to restricted work areas or customized automatic control of environmental conditions.

Solutions are also known that allow the internally mobile worker to freely access a local wired network regardless of the worker's location within the work facility. For example, many systems are known which permit the worker to establish a wireless data link between a portable communication device and a wired LAN. To ensure that the wireless data link remains intact regardless of the position of the portable communication device within the communication space, such systems typically use either RF or diffused IR. However, RF transmissions may be intercepted, thus compromising the confidential nature of many communications. Diffused IR suffers from being sensitive to interference from other optical sources, such as the fluorescent lamps commonly found in the work environment. Thus, it would be desirable to provide a data link that is relativity immune to optical or electronic interference and that is relatively difficult to intercept. An obvious solution is to provide an infrared (IR) line-of-sight data link between an IR transceiver in the communications device and an IR transceiver in communication with the LAN. However, such a solution may unduly restrict mobility within the work space because any inadvertent movement of the communication device or the IR transceiver in communication with the LAN may interrupt the data link. Further, the worker may not be able to freely alter the position of the communication device to permit others to easily view workfiles or other presentation materials displayed by the device. Moreover, the worker may be forced to sit in an inconvenient location solely for the purpose of establishing the data link.

Line-of-sight systems are known which address some of these shortcomings. For example, an infrared transceiver may be attached to a cable wired to the LAN such that the transceiver can be freely moved about the room or placed in various positions on a work surface, such as on a conference table or a desk top. Or, once a link is established between the communication device and the transceiver, an alarm may sound if the individual starts moving the communication device out of range of the transceiver. Still another solution is to lock the position of the communication device relative to the transceiver through the use, for example, of magnets or other types of restraining devices. However, all of these solutions are awkward in certain respects.

Thus, it would be desirable to provide a more elegant solution to these problems than offered by known systems. Such a solution would allow a worker to move freely about the work facility without hindering access to wired systems, such as a LAN. Such a solution also would be capable of locating the worker within the work facility such that communications can be automatically routed to the worker and such that the worker may enjoy certain customized privileges regardless of the worker's location. Locating the worker could be accomplished, for example, by detecting the presence of the worker's portable communication device within a known work area. Further, such a solution would provide a secure data link between the communication device and the LAN that is relatively immune to interference from other optical or electronic sources. Moreover, the solution would ensure that the data link remains intact, despite movement of the portable communication device, without the use of annoying alarms, lengthy cables that clutter the work area, or cumbersome locking devices. The solution could also be used in applications other than data communications with a LAN. For example, a data link could also be established and retained between the portable communication device and an interface circuit that provides data communication access to other electronic devices, such as printers, other peripherals, televisions, etc.

SUMMARY OF THE INVENTION

The present invention provides for detecting the presence of a portable communication device within a work space and then establishing and retaining a data link between the portable communication device and an interface circuit, such as a network access circuit or a serial or parallel communication port. Thus, in accordance with a first aspect of the invention, a wireless data communication system includes an interface circuit, a plurality of transceivers configured to transmit and receive wireless signals within a transceiver space associated with each transceiver, and a control circuit in communication with the interface circuit and the plurality of transceivers. The control circuit initiates a scanning sequence of the transceivers to detect the presence of a wireless signal within one of the plurality of transceiver spaces. When the wireless signal is detected, the control circuit establishes a wireless data link between the communications device and the interface circuit via one of the transceivers which is receiving the wireless signal.

According to another aspect of the invention, a method is provided for establishing a data link between a communication device and an interface circuit in communication with a plurality of transceivers. The transceivers each are configured to receive and transmit wireless signals within a transceiver space associated with the respective transceiver. The plurality of transceiver spaces combine to define a communication space. The method comprises the steps of transmitting a wireless signal within the communication space from the communication device, sequentially scanning each of the transceivers, detecting the presence of the wireless signal within at least one of the transceiver spaces, and establishing a wireless data link between the communication device and the interface circuit via the transceiver associated with the transceiver space in which the wireless signal is detected.

It is one feature of the invention that the wireless data link is a line-of-sight infrared data link.

According to another feature of the invention, the control circuit monitors the wireless data link to detect disruption of data flow. If disruption occurs for greater than a first predetermined time period, the control circuit recommences the scanning sequence. If the disruption remains for greater than a second predetermined time period, the data link is terminated by interface circuit 16.

In yet another embodiment of the invention, the plurality of transceivers are disposed in distinct locations in a work space. The work space may include an article of furniture, such as a conference table, and the transceivers may be attached to the surface of the table.

BRIEF DESCRIPTION OF THE DRAWINGS

The invention will hereafter be described with reference to the accompanying drawings, wherein like reference numerals denote like elements, and.

DETAILED DESCRIPTION OF PREFERRED EMBODIMENTS

Figure 1:
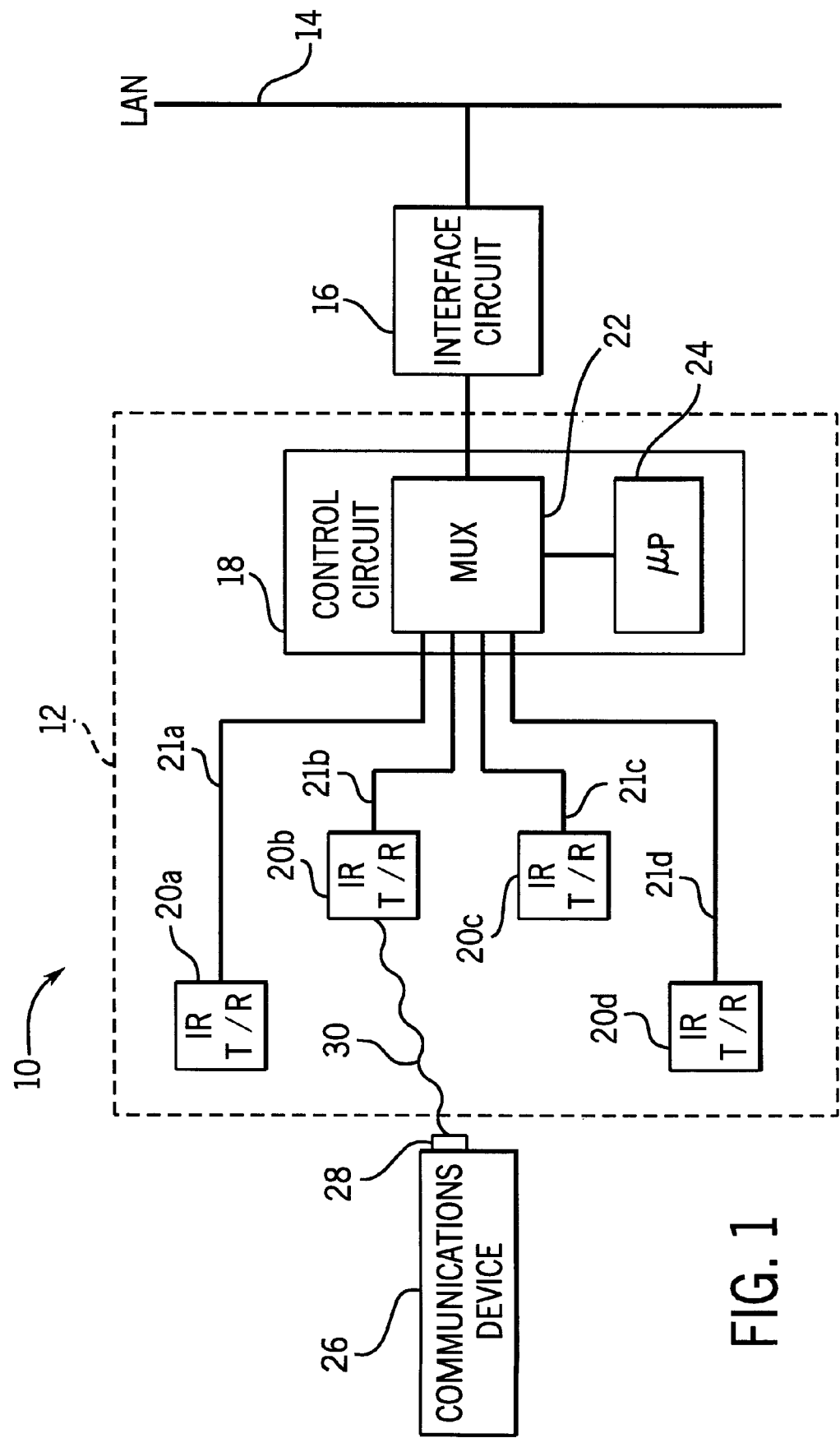
FIG. 1 is a block diagram of a data communication system illustrating the establishment of an infrared data link between a portable data communication device and an interface circuit in communication with a LAN via one of the infrared transceivers of a communication station, in accordance with a preferred embodiment of the present invention.

Referring now to FIG. 1, a block diagram of a preferred embodiment of an infrared data communication system 10 is illustrated. System 10 has the capability of detecting wireless signals transmitted from a portable data communication device within a defined communication space and then automatically establishing a data link between the communication device and an interface circuit in communication with a LAN. Although the preferred embodiment of the invention will be described with respect to an infrared data communication system which operates according to the standards of the Infrared Data Association$^{SM}$ (IrDA protocol), such as the standards set forth in the Infrared Data Association Serial Infrared Link Access Protocol, Version 1.0, Jun. 23, 1994, it should be understood that various other types of wireless protocols could take advantage of the features of the invention, which will be described in detail below. Further, although the interface circuit is described as a network access station that provides for bi-directional communication with a LAN, it should be understood that the interface circuit could be the serial or parallel data communication port of an electronic device, such as a printer, or any circuit or port that allows for data communication with an electronic device (e.g., a television).

In the preferred embodiment illustrated, data communication system 10 includes a communication station 12, a local area network (LAN) 14 (e.g., an Ethernet LAN or other type of network), and an interface circuit 16 which couples communication station 12 to LAN 14. Interface circuit 16 provides communications access to and from LAN 14 by methods well-known to one skilled in the art. Interface circuit 16 may include a variety of electronics, such as an IrDA chip (e.g., an IrDA 1.1 compliant controller) to receive and send data patterned after an IrDA-compliant protocol, a network chip (e.g., an 802.3 compliant LAN controller) to receive and send data having a protocol compatible with the LAN (e.g., a TCP/IP protocol) and to provide a media access control address, a microcontroller to control data transfers between the IrDA chip and the network chip, and a power supply to power the various electronics.

Communication station 12 includes a control circuit 18 coupled to a plurality of infrared transceivers 20a–d via a plurality of communication channels 21a–d. Transceivers 20a–d preferably are IrDA compliant transceivers having up to a 3 meter operating distance and a 30 degree viewing angle, such as the HDSL-1100 transceiver available from Hewlett Packard. Control circuit 18 includes a multiplexor 22 (e.g., a 4-to-1 multiplexor) coupled to a microprocessor 24 (e.g., an AM 188EM or Hitachi SH-1 or equivalent or better microprocessor).

Multiplexor 22, under control of microprocessor 24, links one of communication channels 21a–d to network access point 16, as will be explained more fully below, such that bi-directional communications may be established between a communication device 26 and LAN 14. Communication device 26 may be any of a variety of portable data communication devices (e.g., a laptop computer, a personal digital assistant, etc.) having an infrared port 28 for transmitting and receiving IrDA-compliant infrared signals, such as a signal 30.

Figure 2:
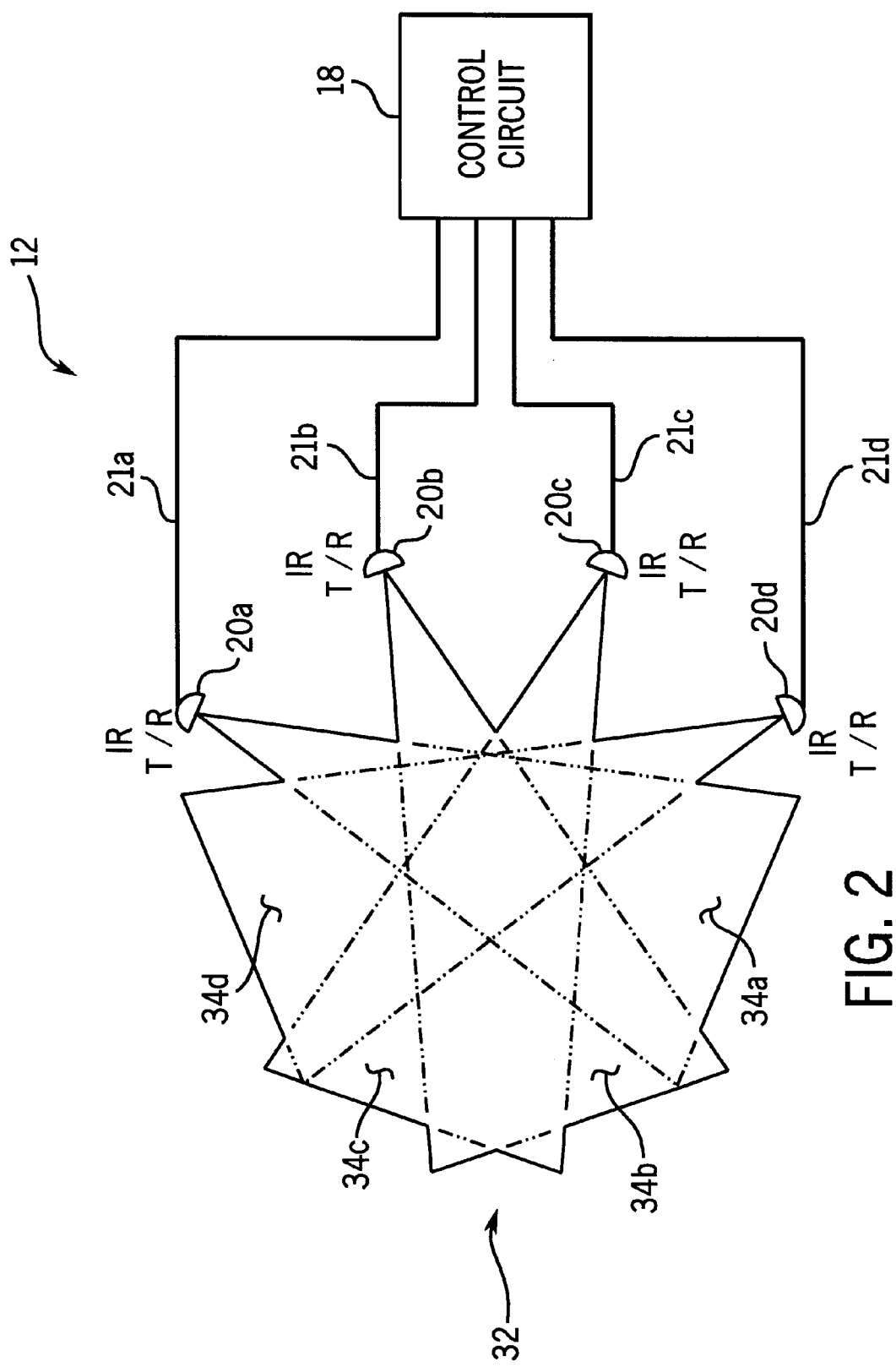
FIG. 2 is a block diagram of the communication station of FIG. 1, schematically illustrating the expanse of a communication space in which wireless signals can be transmitted and received to establish the data link, in accordance with a preferred embodiment of the present invention.

The operation of communication system 10 will now be described with reference to FIGS. 2 and 3A–D. FIG. 2 illustrates communication station 12 and a communication space 32 associated with station 12. Communication space 32, which is illustrated schematically by a solid line, is defined by a plurality of transceiver spaces 34a–d (schematically illustrated by dashed and solid lines), each of which is associated with a transceiver 20a–d. Each transceiver space 34 represents the operating range of the respective transceiver 20, which preferably is a 30 degree cone extending over a range of 3 meters. That is, each transceiver can transmit and receive signals anywhere within the area defined by its transceiver space. Transceivers 20a–d optimally are positioned such that transceiver spaces 34a–d overlap, while at the same time, maximizing the expanse of communication space 32. Accordingly, if a communication device 26 is transmitting an infrared signal anywhere within communication space 32, control circuit 18 can detect the presence of the infrared signal (and thus the presence of communication device 26). Upon detection of a signal, a data link between communication device 26 and interface circuit 16 can be established via one of the infrared transceivers 20a–d.

As shown in FIGS. 3A–D, communications device 26 is positioned such that its infrared port 28 is transmitting an infrared signal 36 within the communication space. Signal 36 generally is a IrDA-compliant data communication that announces the presence of communication device 26. At this stage (i.e., before control circuit 18 has detected the signal), the data in signal 36 is preferably transmitted at a rate of 9600 baud. However, depending on the communication protocol used or the most common data transmission rate available in data communication devices, the data transmission rate may be varied accordingly. Once the signal has been detected and control circuit 18 locks onto a particular channel 21a–d, the data transmission rate can be changed to the highest rate compatible with both communication device 26 and interface circuit 16, as will be explained below.

To detect whether signal 36 is being transmitted, control circuit 18 initiates the scanning sequence which is schematically illustrated in FIGS. 3A–D. That is, control circuit 18 scans each of communication channels 21a–d in a predetermined sequence (e.g., 21a–21b–21c–21d–21a–21b-etc.) to determine whether a particular transceiver 20a–d has received an electrical signal within its associated transceiver space 20a–d. In the preferred embodiment, control circuit 18 completes the scanning sequence of channels 21a–d in approximately 10 to 15 microseconds.

In the preferred embodiment, control circuit 18 also includes a flip-flop (not shown) coupled between each communication channel 21a–d and microprocessor 24. The use of flip-flops is desirable because the data on channels 21a–d may be transmitted at a rate higher than microprocessor 24 can scan each channel. Thus, the flip-flops latch the data to give microprocessor 24 sufficient time to determine whether a signal has been received on a particular channel 21.

Figure 3A:
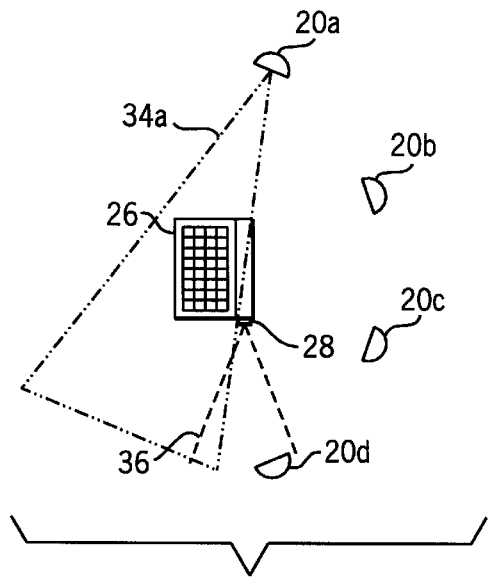
FIGS. 3A–D schematically illustrate the individual transceiver spaces which define the communication space of FIG. 2 and further a preferred scanning method by which the communication station sequentially scans for the presence of a wireless signal within the respective transceiver spaces.
Figure 3B:
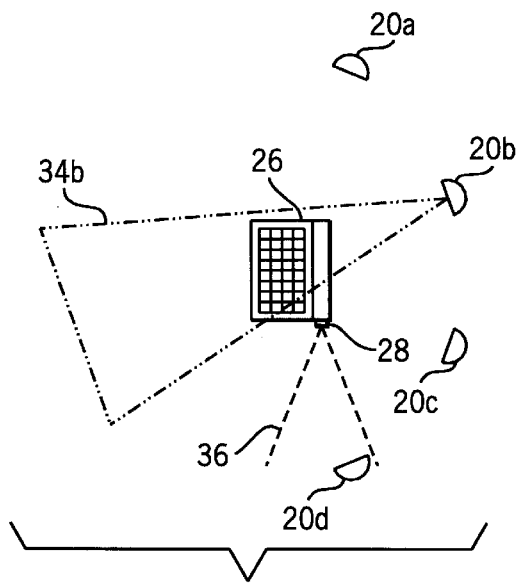
Figure 3C:
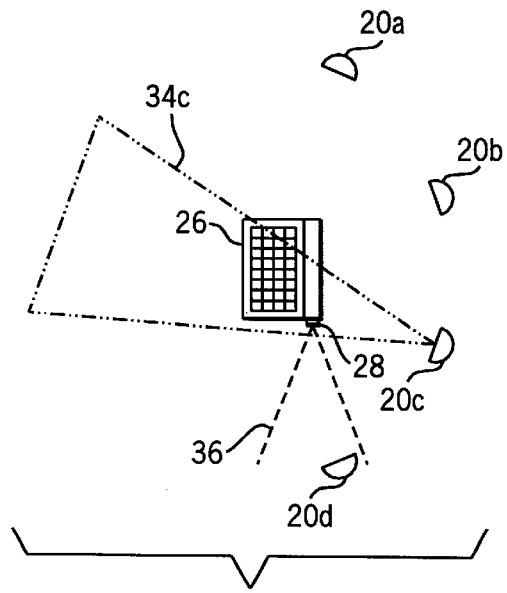
Figure 3D:
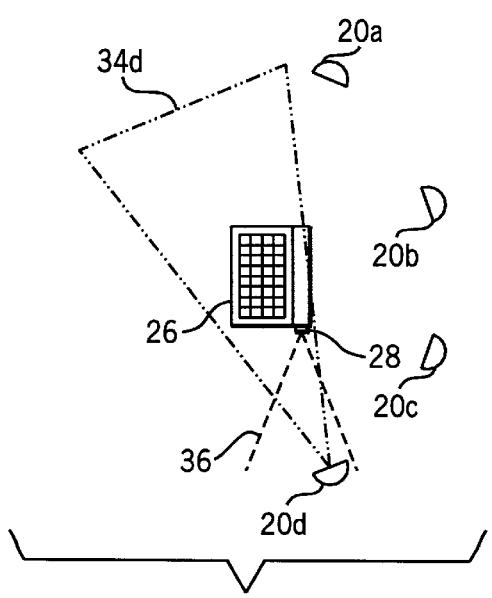

To start the scanning sequence, as illustrated in FIG. 3A, control circuit 18 first monitors communication channel 21a to determine whether the transceiver 20a is receiving a signal within its transceiver space 34a. As shown in FIG. 3A, although a portion of signal 36 falls within space 34a, signal 36 is not directed at transceiver 20a and thus cannot be detected. If signal 36 cannot be detected, then control circuit 18 moves to channel 21b to determine whether transceiver 20b is receiving signal 36 within its transceiver space 34b (FIG. 3B). If signal 36 cannot be detected, the control circuit 18 moves to channel 21c to determine whether transceiver 20c is receiving signal 36 within its transceiver space 34c (FIG. 3C) Again, if no signal is detected, then control circuit 18 moves to channel 21d (FIG. 3D). Control circuit 18 continues its scanning sequence until a signal 36 is detected.

In the preferred embodiment, to detect signal 36, circuit 18 looks for an electrical signal transition on one of the channels 21. Upon detection of a signal transition, circuit 18 resets the particular channel 21 to its previous condition, waits for a predetermined time, and then checks the channel again. If another signal transition is detected, then signal 36 is deemed detected on that channel 21.

Control circuit 18 waits for the predetermined time before re-checking the channel in order to eliminate the possibility that the detected signal transition may have been caused by noise or other interference. For example, fluorescent lights are a common noise source in office environments. Signal transitions attributable to fluorescent lights typically will have a duration on the order to 100 microseconds. Thus, circuit 18 should wait for a time period greater than 100 microseconds to avoid mistaking this type of noise for an actual data transmission. However, if circuit 18 waits too long, it may miss a data transmission from communication device 26. In the preferred embodiment, device 26 can transmit data within a period of 10 to 20 milliseconds. Accordingly, before re-checking the channel, circuit 18 waits for 2 milliseconds, which is long enough to eliminate noise and short enough to catch an actual data transmission.

Although in FIGS. 3A–D the communication device is illustrated as being positioned with transceiver spaces 34a–d, it should be understood that the communication device itself may be at a location outside of the transceiver spaces. That is, only the infrared signal transmitted by the communication device need be present within one of the transceiver spaces. Further, although four transceivers are illustrated, it should be understood that fewer or more transceivers may be used.

Figure 4:
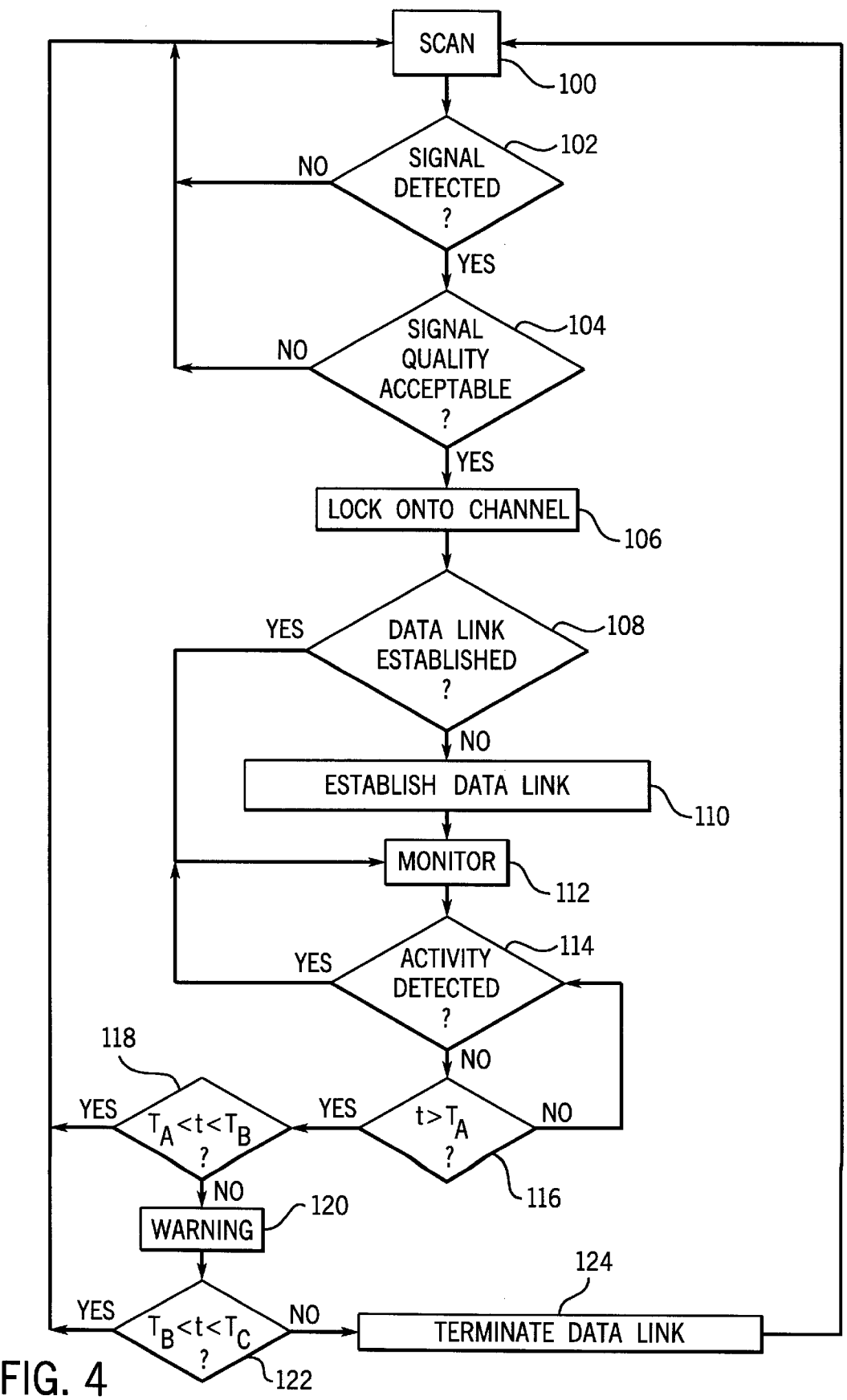
FIG. 4 is a flow chart of the steps of the scanning sequence illustrated in FIGS. 3A–D.

Referring now to FIG. 4, a flow chart illustrates the steps of the scanning sequence described above and the subsequent steps performed to establish and retain bi-directional communications between communication device 26 and LAN 14. The flow chart begins at step 100 in which control circuit 18 commences sequential scanning of each transceiver channel 21a–d. Circuit 18 scans each channel 21 for a sufficient period of time to determine whether signal 36 is being received (step 102). If an electrical signal transition is not detected, then control circuit 18 returns to step 100 and moves on to the next channel 21 in the sequence. If a signal transition is detected, then control circuit 18 may perform a quality check on the signal (step 104).

The quality check may simply consist of waiting for a sufficient period of time (e.g., 2 milliseconds) before checking the channel again as explained above. This technique assists in precluding the possibility that the detected signal is a glitch or some other interference. Alternatively, other quality checks of the signal, which are supported by the communication protocol used, may be performed to determine the sufficiency of the reception. Such quality checks may be desirable because it is possible, due to the overlap of transceiver spaces 34, that the signal may be received on more than one channel. In such a case, it would be beneficial to pick the channel which has the best reception.

Returning to step 104, if the quality of the signal is poor (e.g., the signal transition does not reappear on the channel 21 after resetting the channel and waiting for a period of time), the control circuit 18 returns to step 100 and resumes the scanning sequence. If, however, the quality is good (e.g., the signal transition re-appears), then control circuit 18 locks onto the channel 21 that is receiving the signal (step 106). Control circuit 18 may either lock on the first channel 21 in the scanning sequence on which signal activity is detected, or, in alternative embodiments, circuit 18 may lock on the channel 21 which is exhibiting the best receipt of the signal as determined, for example, by the quality check at step 104. As illustrated in FIG. 1, circuit 18 locks on to the communication channel 21 via multiplexor 22 or some other type of switching device under control of microprocessor 24.

Next, at step 108, it must be determined whether a data link has been established with interface circuit 16. In certain situations, which will be described below, a data link may be in place even though control circuit 18 is performing a scanning sequence. If the data link has already been established, then the procedure moves to step 112. Otherwise, a data link is established at step 110.

At step 110, the data link between communication device 26 and interface circuit 16 is established by well-known methods, such as a handshake procedure in which, for example, communication device 26 and interface circuit 16 identify themselves, exchange their respective data transmission rate capabilities, and adjust their rates to the highest common rate. Once this procedure is performed, a bi-directional data link is established.

At step 112, the control circuit 18 monitors the communication channel 21 that was locked onto in step 106 to determine whether an electrical signal is still present. If a signal is present, circuit 18 will continue to monitor channel 21. The absence of a signal, however, is an indication that the communication link between communication device 26 and the transceiver 20 has been disrupted and steps must be taken to reestablish the link.

Disruptions may occur for a variety of reasons. For example, an object, such as a hand or a piece of paper, may temporarily pass through the communication link and disrupt communications. Or the user may inadvertently bump communication device 26 such that its signal is no longer within the operating range defined by the transceiver space 34. As still another alternative, the user may purposely reposition communications device 26 to move to a more convenient working position or to show a co-worker a display on the device's display screen. If such movements should occur, it would be desirable to resume the communication link with the minimum amount of disruption.

Accordingly, if, at step 114, an electrical signal is not detected, then circuit 18 will set a grace period counter which preferably has a time-out $T_A$. $T_A$ preferably is within the range of 0.5 seconds to 5 seconds, and most preferably is 1 second. During this grace period, control circuit 18 retains the lock on the communication channel 21 which previously was exhibiting activity. Upon expiration of the grace period, control circuit 18 breaks the lock on communication channel 21 and re-initiates the scanning sequence at step 100 in an attempt to re-establish communications via one of the communication channels 21a–d.

If control circuit 18 detects an electrical signal on a channel 21 before expiration of a time $T_B$, circuit 18 will lock on that channel, data communications will resume, and the user most like will not realize that a disruption has occurred. In the preferred embodiment, $T_B$ is preferably in the range of 2 seconds to 6 seconds, and most preferably is 3 seconds. If, however, an electrical signal is not detected before expiration of $T_B$ (step 118), then a warning will be provided to the user (step 120). The warning may be provided to the user by the communication software installed in communications device 26. For example, device 26 may generate an audible alarm (e.g., a beep), a visible alarm (e.g., a flashing light or a text message), or a combination of both. Or, a warning may be provided by interface circuit 16, such as by causing a transceiver 20 to blink. If the scanning sequence does pick up an electrical signal, however, then communications with interface circuit 16 will resume.

If an electrical signal still is not detected after expiration of a third time period $T_C$ (step 122), then interface circuit 16 will terminate the data link (step 124). In the preferred embodiment, $T_C$ is in the range of 3 seconds to 40 seconds, and most preferably is 12 seconds. If an electrical signal is detected after $T_C$ has expired, then the data link must be re-negotiated at step 108 in order to resume communications.

Other types of disruptions can also occur which interrupt the communication link between communications device 26 and communication station 12. For example, the user may replace device 26 with another communication device 26. If the replacement occurs within time $T_C$ (i.e., before termination of the data link between device 26 and interface circuit 16), communications between the new device 26 and interface circuit 16 will resume as discussed above. However, interface circuit 16 will eventually recognize that the original device 26 has been replaced because of a detected change in the address byte in the communication packets. A warning may then be provided to alert the user to remove new device 26. If new device 26 is not removed within time $T_C$, then the data link will be terminated as discussed above. If, however, new device 26 is replaced with the original device 26 within time $T_C$, then communications between original device 26 and interface circuit 16 will resume without interruption of the data link.

Figure 5:
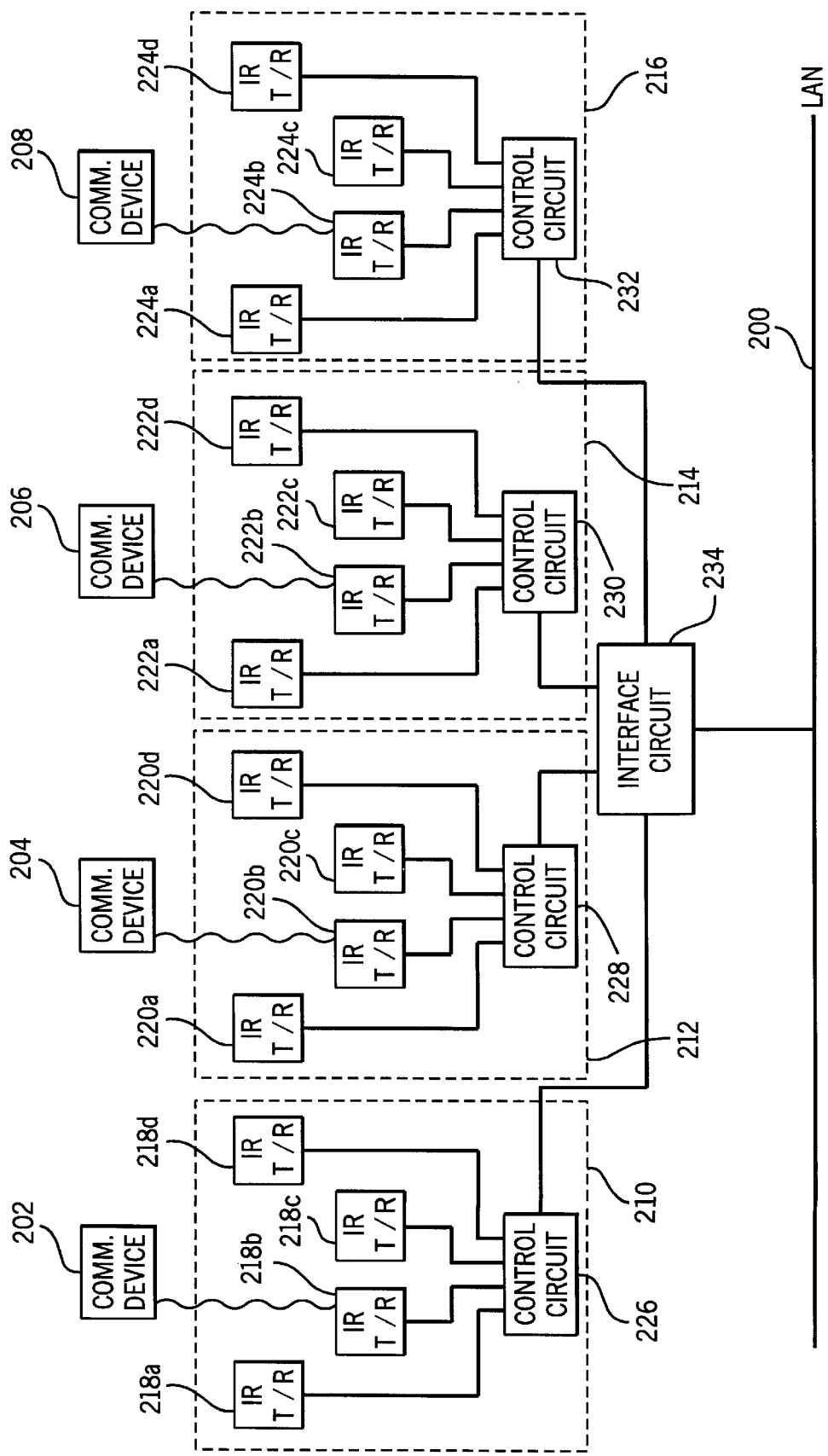
FIG. 5 is a block diagram of an alternative embodiment of a data communication system in which a common data link is established between a plurality of communication devices and an interface circuit in communication with a LAN.

Referring now to FIG. 5, an alternative embodiment of an infrared communications system is illustrated which includes a LAN 200, a plurality of communication devices 202, 204, 206, and 208 and a plurality of communication stations 210, 212, 214, and 216. The communication stations each include a plurality of infrared transceivers (218a–d, 220a–d, 222a–d, and 224a–d) and a control circuit (226, 228, 230, and 232). Each of the communication stations operate as discussed above with respect to communication station 12. The control circuits 226, 228, 230 and 232 are commonly connected to an interface circuit 234, which, in this case, is a four-port interface circuit. Thus, multiple communication devices can communicate with LAN 200 via a single interface circuit 234 which combines the data communications in a manner well-known in the art.

Figure 6:
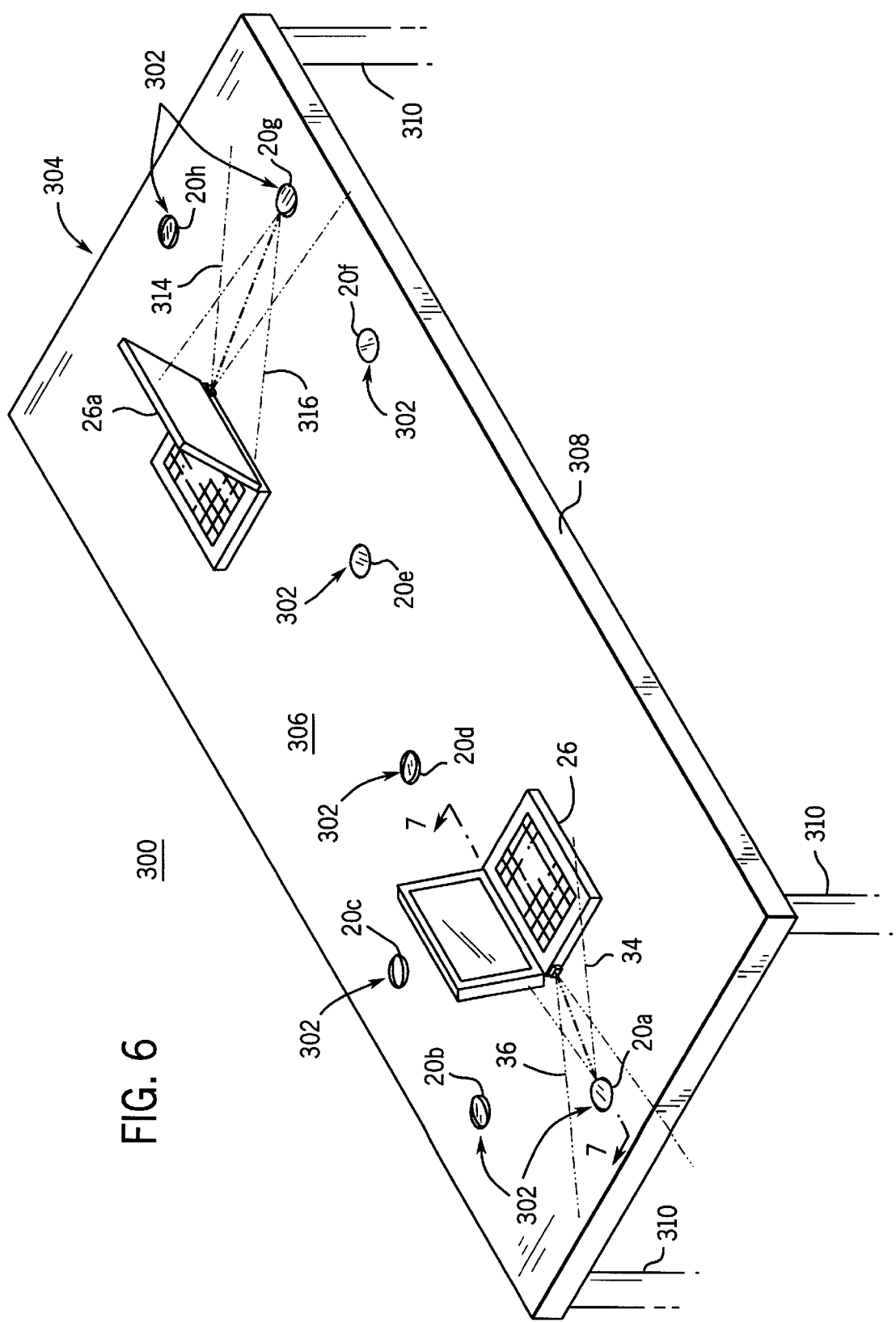
FIG. 6 is a perspective view of a work space having a table to which two of the communication stations of FIG. 1 are attached, according to a preferred exemplary embodiment of the invention.
Figure 7:
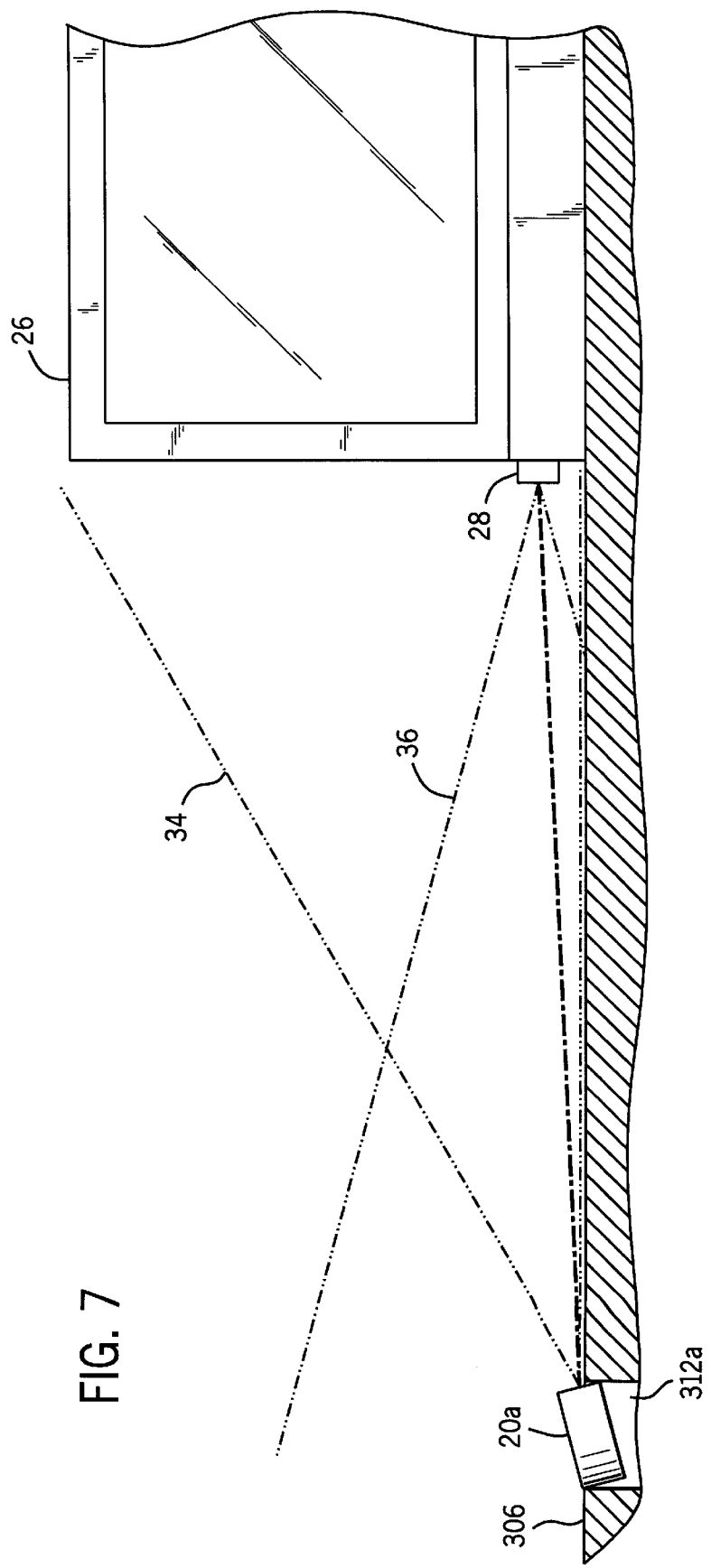
FIG. 7 is a cross-sectional view taken along the line 7—7 of FIG. 6, illustrating the association of one infrared transceiver with the table.

Referring generally to FIGS. 6 and 7, system 10 is illustrated in one exemplary environment. In this environment, a work space 300, such as a conference room or office in a work facility, includes transceivers 20a–d disposed at a plurality of distinct locations 302 within work space 300. Distinct locations 302 may be disposed at a variety of points throughout work space 300. For example, the distinct locations may be disposed along points of an outer wall, suspended from a ceiling, or disposed at points associated with an article of furniture 304 within work space 300, such as a work surface 306. In the illustrated embodiment, work surface 306 forms part of a table 308 having a plurality of legs 310 supporting work surface 306.

As illustrated, communication device 26 is also positioned within work space 300, e.g., on work surface 306, for establishing a data link with interface circuit 16, as described above. That is, to establish a data link, communications device 26 is positioned such that it transmits a signal 36 (illustrated schematically by dashed lines) that is received within the transceiver space 34 associated with one of transceivers 20a–d.

Figure 8:
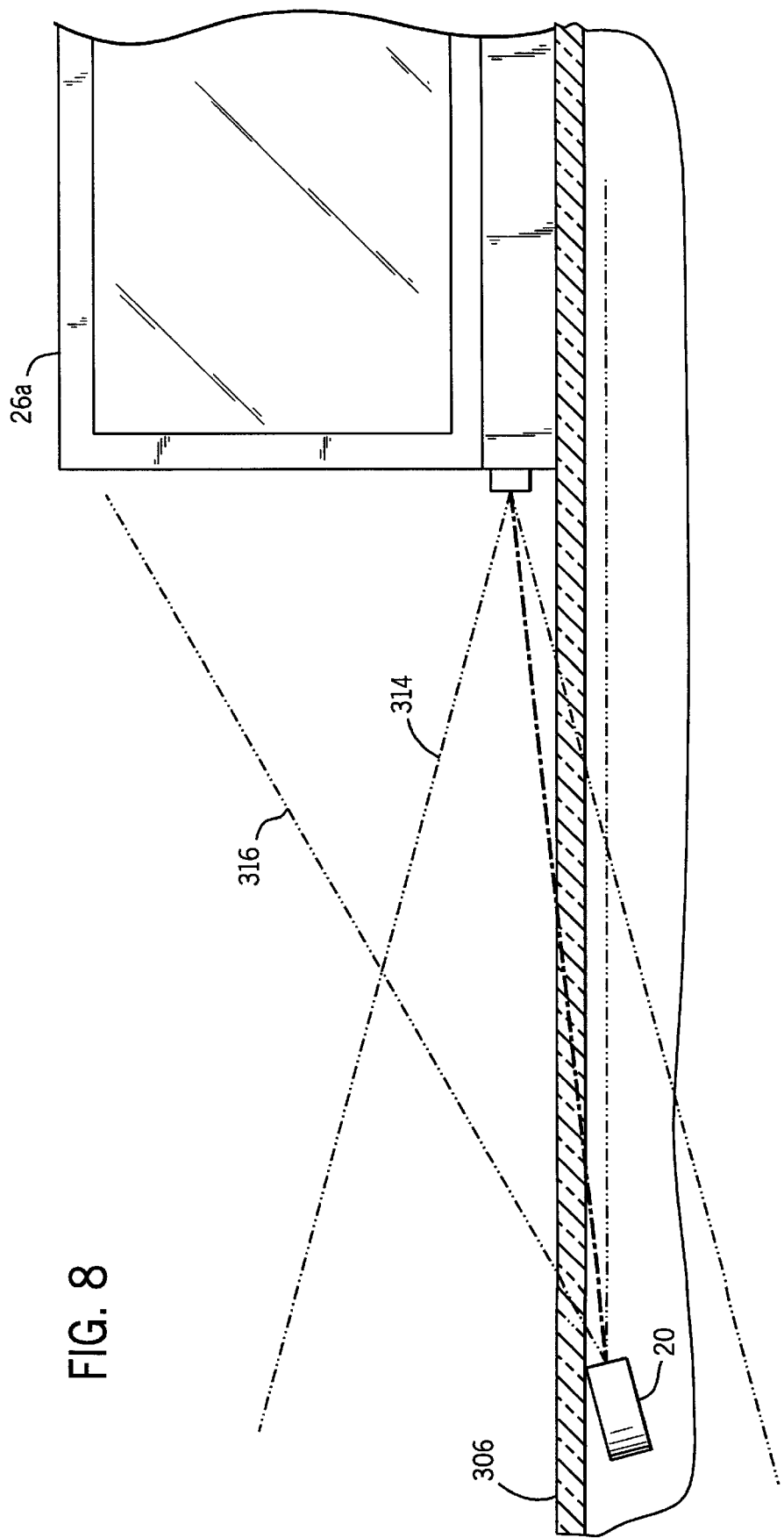
FIG. 8 is a cross-sectional view illustrating an alternative association of the infrared transceiver with the table.

In this embodiment, each transceiver 20a–d associated with communication station 12 is mounted in a corresponding recess 312a–d formed in work surface 306 of table 308. Preferably, each transceiver extends slightly above work surface 306, as best illustrated in FIG. 7, for optimal provision of a transceiver space 34 (as illustrated schematically by dashed lines) for establishing a communication link between communication device 26 and the transceiver. Alternately, the transceivers may be mounted beneath work surface 306 as illustrated in FIG. 8. In this embodiment, it is preferred that work surface 306 include a material that facilitates transmission of the signals between the transceivers and the communication device 26. An exemplary material is a plexiglass made from an infrared transmitting material, such as is available from Glasflex of Sterling, N.J., which also serves to filter transmissions from other optical sources, such as fluorescent lights. In the preferred embodiment, the infrared material is disposed beneath a layer of glass. Control circuit 18 and interface circuit 16 (not shown) may also be mounted to or below work surface 306.

Furthermore, additional transceivers and communication devices may be disposed within work space 300 as necessary. By way of example, a second set of transceivers 20e–h which are associated with a second communication station may be disposed in work surface 306 of table 308, as illustrated in FIG. 6. A second communication device 26a may be disposed at an appropriate location within work space 300 for communication with transceivers 20e–h, as described above. As illustrated, the communication device would typically be placed on work surface 306, such that it transmits an infrared signal 314 (illustrated schematically by dashed lines) within the operating range (e.g., transceiver space 316 (illustrated schematically by dashed lines)) of at least one of transceivers 20e–h. Communication devices 26 and 26a may establish a data link to the LAN via a single interface circuit as illustrated in FIG. 5. Or, the data link may be established via two interface circuits which each correspond to one of communication devices 26 and 26a.

It will be understood that the foregoing description is of preferred exemplary embodiments of this invention and that the invention is not limited to the specific form shown. For example, wireless protocols other than the IrDA standard may be used. The communication system may include other communication stations which provide for a wired data link as opposed to a wireless link. These and other modifications may be made in the design and arrangement of the elements without departing from the scope of the invention as expressed in the appended claims.

What is claimed is:

1. A data communication system for establishing and retaining a data link between an interface circuit and a communication device having a wireless port for transmitting and receiving a wireless signal, the system comprising:

an interface circuit;

a plurality of transceivers in communication with the interface circuit, each transceiver configured to transmit and receive a wireless signal within a transceiver space associated with the respective transceiver; and a control circuit in communication with the interface circuit and the plurality of transceivers, the control circuit configured to scan the plurality of transceivers in a scanning sequence to detect presence of a wireless signal within any one of the plurality of transceiver spaces;

wherein, when the wireless port transmits a wireless signal within one of the plurality of transceiver spaces, the control circuit automatically locks onto the transceiver associated with the transceiver space in which the wireless signal was detected, thereby enabling the data link between the interface circuit and the communication device.

2. The data communication system as recited in claim 1, wherein the control circuit locks onto the first transceiver in the scanning sequence associated with the transceiver space in which the wireless signal was first detected.

3. The data communication system as recited in claim 1, wherein the control circuit monitors the data link established between the wireless port and the interface circuit to detect disruption of data flow on the data link.

4. The data communication system as recited in claim 3, wherein if the disruption of the data flow is detected for greater than a predetermined time period, the control circuit recommences the scanning sequence.

5. The data communication system as recited in claim 4, wherein the predetermined time period is in the range of approximately 0.5 to 5 seconds.

6. The data communication system as recited in claim 4, wherein the predetermined time period is 1 second.

7. The data communication system as recited in claim 1, wherein the interface circuit is in communication with a LAN.

8. The data communication system as recited in claim 1, wherein the plurality of transceivers are disposed in distinct locations within a work space.

9. The data communication system as recited in claim 8, further including an article of furniture, wherein the distinct locations are associated with the article of furniture.

10. The data communication system as recited in claim 9, wherein the article of furniture includes a work surface and the communication device is positioned on the work surface to establish the data link.

11. The data communication system as recited in claim 9, wherein the plurality of transceivers are at least partially embedded within the article of furniture.

12. The data communication system as recited in claim 1, wherein the communications device is a portable computing device.

13. The data communication system as recited in claim 1, wherein the data link is a line-of-sight infrared data link.

14. A method for establishing and retaining a data link between a communication device having a wireless communication port and an interface circuit in communication with a plurality of transceivers, each of the transceivers configured to receive and transmit wireless signals within a transceiver space associated with the respective transceiver, the plurality of transceiver spaces defining a communication space, the method comprising:

transmitting a wireless signal within the communication space from the wireless communication port of the communication device;

sequentially scanning each of the plurality of transceivers;

detecting presence of the wireless signal within at least one of the transceiver spaces defining the communication space; and locking onto the transceiver associated with the at least one transceiver space in which the wireless signal is present to establish the data link between the communication device and the interface circuit.

15. The method as recited in claim 14, further comprising monitoring the data link to detect disruption of receipt of the wireless signal.

16. The method as recited in claim 15, further comprising generating a warning to indicate the disruption.

17. The method as recited in claim 15, further comprising recommencing sequentially scanning the plurality of transceivers if the detected disruption occurs for greater than a first predetermined time period.

18. The method as recited in claim 17, wherein the first predetermined time period is in the range of approximately 0.5 to 5 seconds.

19. The method as recited in claim 17, further comprising reestablishing the data link if presence of a wireless signal transmitted from the wireless port of the communication device is detected within a second predetermined time period.

20. The method as recited in claim 19, wherein the second predetermined time period is in the range of approximately 3 to 40 seconds.

21. The method as recited in claim 14, wherein the plurality of transceivers are disposed at discrete locations within a work space.

22. The method as recited in claim 21, further comprising an article of furniture disposed within the work space, wherein the discrete locations are associated with the article of furniture.

23. The method as recited in claim 21, wherein the article of furniture includes a work surface and the wireless signal from the wireless communication port of the communication device is transmitted while the communication device is positioned on the work surface.

24. The method as recited in claim 22, wherein the plurality of transceivers are at least partially embedded within the article of furniture.

25. The method as recited in claim 14, further comprising:

detecting presence of a second wireless signal within at least one of the transceiver spaces defining the communication space, the second infrared signal being transmitted from a wireless communication port of a second communication device; and terminating the data link if the second communication device is not removed within a predetermined time period.

26. The method as recited in claim 14, wherein the interface circuit is in communication with a LAN.

27. The method as recited in claim 14, wherein the data link is a line-of-sight infrared data link.

28. An infrared data communications system for establishing and retaining a data link between a network and a communication device disposed in a work space, the system comprising:

an article of furniture disposed in the work space;

a plurality of infrared transceivers disposed at discrete locations associated with the article of furniture such that the plurality of infrared transceivers transmit and receive infrared signals within a communication space; and a control circuit in communication with the plurality of infrared transceivers and the network and configured to detect presence of a line-of-sight infrared signal within the communication space, the line-of-sight infrared signal being transmitted by the communication device;

wherein the control circuit locks onto one of the plurality of infrared transceivers upon detection of the infrared signal in the communication space, thereby enabling the data link between the network and the communication device.

29. The system as recited in claim 28, wherein the communication space is defined by a plurality of transceiver spaces, each of the transceiver spaces being associated with one of the plurality of transceivers, and the control circuit locks onto the transceiver associated with the transceiver space in which the infrared signal is detected.

30. The system as recited in claim 28, wherein the article of furniture includes a work surface and the plurality of infrared transceivers are at least partially embedded in the work surface.

31. The system as recited in claim 28, wherein the control circuit detects the presence of the infrared signal by scanning the plurality of transceivers in a scanning sequence to determine whether one of the plurality of transceivers is receiving the infrared signal.

32. The system as recited in claim 31, wherein the control circuit monitors the data link to detect disruption of data flow.

33. The system as recited in claim 32, wherein the control circuit recommences the scanning sequence if the disruption occurs for greater than a first period of time.

34. The system as recited in claim 33, wherein the first period of time is in the range of approximately 0.5 second to 5 seconds.

35. The system as recited in claim 33, wherein the data link between the network and the communication device is terminated if the disruption occurs for greater than a second period of time.

36. The system as recited in claim 35, wherein the second period of time is in the range of approximately 3 to 40 seconds.

37. A data communication system for establishing a data link between an interface circuit and a communication device having a wireless port for transmitting and receiving a wireless signal, the system comprising:

an interface circuit;

a plurality of transceivers, each transceiver configured to transmit and receive a wireless signal within a transceiver space associated with the respective transceiver; and a control circuit in communication with the interface circuit and the plurality of transceivers, the control circuit configured to scan the plurality of transceivers in a scanning sequence to detect presence of a wireless signal within any one of the plurality of transceiver spaces;

wherein, when the wireless port transmits a wireless signal within one of the plurality of transceiver spaces, the control circuit automatically locks onto the transceiver associated with the transceiver space in which the wireless signal was detected, thereby enabling the data link between the interface circuit and the communication device;

wherein the control circuit monitors the data link established between the wireless port and the interface circuit to detect disruption of data flow on the data link; and wherein if the disruption of the data flow is detected for greater than a predetermined time period, the control circuit recommences the scanning sequence.

38. The data communication system as recited in claim 37, wherein the control circuit locks onto the first transceiver in the scanning sequence associated with the transceiver space in which the wireless signal was first detected.

39. The data communication system as recited in claim 37, wherein the predetermined time period is in the range of approximately 0.5 to 5 seconds.

40. The data communication system as recited in claim 37, wherein the predetermined time period is 1 second.

41. The data communication system as recited in claim 37, wherein the interface circuit is in communication with a LAN.

42. The data communication system as recited in claim 37, wherein the plurality of transceivers are disposed in distinct locations within a work space.

43. The data communication system as recited in claim 42, further including an article of furniture, wherein the distinct locations are associated with the article of furniture.

44. The data communication system as recited in claim 43, wherein the article of furniture includes a work surface and the communication device is positioned on the work surface to establish the data link.

45. The data communication system as recited in claim 43, wherein the plurality of transceivers are at least partially embedded within the article of furniture.

46. The data communication system as recited in claim 37, wherein the communications device is a portable computing device.

47. The data communication system as recited in claim 37, wherein the data link is a line-of-sight infrared data link.

48. A method for establishing a data link between a communication device having a wireless communication port and an interface circuit in communication with a plurality of transceivers, each of the transceivers configured to receive and transmit wireless signals within a transceiver space associated with the respective transceiver, the plurality of transceiver spaces defining a communication space, the method comprising:

transmitting a wireless signal within the communication space from the wireless communication port of the communication device;

sequentially scanning each of the plurality of transceivers;

detecting presence of the wireless signal within at least one of the transceiver spaces defining the communication space;

locking onto the transceiver associated with the at least one transceiver space in which the wireless signal is present to establish the data link between the communication device and the interface circuit;

monitoring the data link to detect disruption of receipt of the wireless signal; and recommencing sequentially scanning the plurality of transceivers if the detected disruption occurs for greater than a first predetermined time period.

49. The method as recited in claim 48, further comprising generating a warning to indicate the disruption.

50. The method as recited in claim 48, wherein the first predetermined time period is in the range of approximately 0.5 to 5 seconds.

51. The method as recited in claim 48, further comprising re-establishing the data link if presence of a wireless signal transmitted from the wireless port of the communication device is detected within a second predetermined time period.

52. The method as recited in claim 51, wherein the second predetermined time period is in the range of approximately 3 to 40 seconds.

53. The method as recited in claim 48, wherein the plurality of transceivers are disposed at discrete locations within a work space.

54. The method as recited in claim 53, further comprising an article of furniture disposed within the work space, wherein the discrete locations are associated with the article of furniture.

55. The method as recited in claim 53, wherein the article of furniture includes a work surface and the wireless signal from the wireless communication port of the communication device is transmitted while the communication device is positioned on the work surface.

56. The method as recited in claim 54, wherein the plurality of transceivers are at least partially embedded within the article of furniture.

57. The method as recited in claim 48, further comprising:

detecting presence of a second wireless signal within at least one of the transceiver spaces defining the communication space, the second infrared signal being transmitted from a wireless communication port of a second communication device; and terminating the data link if the second communication device is not removed within a predetermined time period.

58. The method as recited in claim 48, wherein the interface circuit is in communication with a LAN.

59. The method as recited in claim 48, wherein the data link is a line-of-sight infrared data link.

60. An infrared data communications system for establishing a data link between a network and a communication device disposed in a work space, the system comprising:

an article of furniture disposed in the work space;

a plurality of infrared transceivers disposed at discrete locations associated with the article of furniture such that the plurality of infrared transceivers transmit and receive infrared signals within a communication space; and a control circuit in communication with the plurality of infrared transceivers and the network and configured to detect presence of a line-of sight infrared signal within the communication space, the line-of-sight infrared signal being transmitted by the communication device;

wherein the control circuit locks onto one of the plurality of infrared transceivers upon detection of the infrared signal in the communication space, thereby maintaining the data link between the network and the communication device;

wherein the control circuit detects the presence of the infrared signal by scanning the plurality of transceivers in a scanning sequence to determine whether one of the plurality of transceivers is receiving the infrared signal; and wherein the control circuit monitors the data link to detect disruption of data flow and recommences the scanning sequence if the disruption occurs for greater than a first period of time.

61. The system as recited in claim 60, wherein the communication space is defined by a plurality of transceiver spaces, each of the transceiver spaces being associated with one of the plurality of transceivers, and the control circuit locks onto the transceiver associated with the transceiver space in which the infrared signal is detected.

62. The system as recited in claim 60, wherein the article of furniture includes a work surface and the plurality of infrared transceivers are at least partially embedded in the work surface.

63. The system as recited in claim 60, wherein the first period of time is in the range of approximately 0.5 second to 5 seconds.

64. The system as recited in claim 60, wherein the data link between the network and the communication device is terminated if the disruption occurs for greater than a second period of time.

65. The system as recited in claim 64, wherein the second period of time is in the range of approximately 3 to 40 seconds.

* * * * *

UNITED STATES PATENT AND TRADEMARK OFFICE
CERTIFICATE OF CORRECTION

PATENT NO.    : 6,298,047 B1
DATED         : October 2, 2001
INVENTOR(S)   : Christopher Carl Steffes, Anthony Tonizzo and George William Vallillee, IV It is certified that error appears in the above-identified patent and that said Letters Patent is hereby corrected as shown below:

<u>Title page,</u>
Item [73], replace "Steelcase Development Inc. (Caledonia, MI)" with -- Steelcase Development Inc. (Caledonia, MI); Datalogic Corporation (Grand Rapids, MI) --

Signed and Sealed this

Twelfth Day of November, 2002

*Attest:*

*Attesting Officer*

JAMES E. ROGAN
*Director of the United States Patent and Trademark Office*